(12) United States Patent
Parkvall et al.

(10) Patent No.: US 10,779,228 B2
(45) Date of Patent: *Sep. 15, 2020

(54) METHODS AND APPARATUSES FOR ENABLING A WIRELESS DEVICE TO COMMUNICATE WITH A RADIO NETWORK NODE IN AN UNLICENSED SPECTRUM

(71) Applicant: Telefonaktiebolaget LM Ericsson (publ), Stockholm (SE)

(72) Inventors: Stefan Parkvall, Bromma (SE); Erik Dahlman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,791

(22) Filed: Jul. 23, 2019

(65) Prior Publication Data

US 2019/0349847 A1 Nov. 14, 2019

Related U.S. Application Data

(63) Continuation of application No. 16/029,201, filed on Jul. 6, 2018, now Pat. No. 10,405,268, which is a
(Continued)

(51) Int. Cl.
*H04W 48/16* (2009.01)
*H04W 16/14* (2009.01)
(Continued)

(52) U.S. Cl.
CPC ............ *H04W 48/16* (2013.01); *H04L 5/001* (2013.01); *H04L 5/0048* (2013.01);
(Continued)

(58) Field of Classification Search
CPC ..... H04W 48/16; H04W 16/14; H04W 16/02; H04W 76/025; H04W 88/08;
(Continued)

(56) References Cited

U.S. PATENT DOCUMENTS

| 9,609,585 | B1* | 3/2017 | Markovic | H04W 48/20 |
|---|---|---|---|---|
| 2015/0181508 | A1* | 6/2015 | Uchino | H04W 16/32 |
| | | | | 455/434 |

FOREIGN PATENT DOCUMENTS

| CN | 103329600 A | 9/2013 |
|---|---|---|
| CN | 103428817 A | 12/2013 |

(Continued)

OTHER PUBLICATIONS

Unknown, Author, "Drivers, Benefits and Challenges for LTE in Unlicensed Spectrum", 3GPP TSG-RAN Meeting #62, RP-131701, AT&T, Busan, Korea, Dec. 3-6, 2013, pp. 1-3.
(Continued)

*Primary Examiner* — Afshawn M Towfighi
(74) *Attorney, Agent, or Firm* — Murphy, Bilak & Homiller, PLLC (57) ABSTRACT

A wireless device, a radio network node, and methods therefor, for communicating in a network. The wireless device is configured to determine one or more possible first sequences of a discovery signal. The wireless device is configured to receive a second sequence of the discovery signal, and to determine if the one or more possible first sequences match the second sequence.

10 Claims, 4 Drawing Sheets

Related U.S. Application Data continuation of application No. 15/110,040, filed as application No. PCT/SE2014/050008 on Jan. 7, 2014, now Pat. No. 10,034,230.

(51) Int. Cl.

| | | |
|---|---|---|
| *H04L 5/00* | (2006.01) | |
| *H04L 29/08* | (2006.01) | |
| *H04W 16/02* | (2009.01) | |
| *H04L 27/00* | (2006.01) | |
| *H04W 76/15* | (2018.01) | |
| *H04W 88/02* | (2009.01) | |
| *H04W 88/08* | (2009.01) | |

(52) U.S. Cl.
CPC .......... *H04L 69/323* (2013.01); *H04W 16/02* (2013.01); *H04W 16/14* (2013.01); *H04L 27/0006* (2013.01); *H04W 76/15* (2018.02); *H04W 88/02* (2013.01); *H04W 88/08* (2013.01)

(58) Field of Classification Search
CPC ...... H04W 88/02; H04L 69/323; H04L 5/001; H04L 5/0048; H04L 27/0006
See application file for complete search history.

(56) References Cited

FOREIGN PATENT DOCUMENTS

| | | |
|---|---|---|
| RU | 2485719 C2 | 6/2013 |
| WO | 2012078565 A1 | 6/2012 |
| WO | 2012116489 A1 | 9/2012 |
| WO | 2013103754 A1 | 7/2013 |
| WO | 2013126843 A2 | 8/2013 |
| WO | 2013155680 A1 | 10/2013 |
| WO | 2015099585 A1 | 7/2015 |

OTHER PUBLICATIONS

Unknown, Author, "Introducing LTE in Unlicensed Spectrum", 3GPP RAN #62, RP-131635, Qualcomm, Ericsson, Busan, South Korea, Dec. 3-7, 2013, pp. 1-8.

Unknown, Author, "New Band for LTE deployment as Supplemental Downlink in unlicensed 5.8 GHz in USA-Feature WID", 3GPP TSG-RAN4 Meeting #62, RP-131680, Verizon, Busan, Korea, Dec. 3-6, 2013, pp. 1-5.

* cited by examiner

METHODS AND APPARATUSES FOR ENABLING A WIRELESS DEVICE TO COMMUNICATE WITH A RADIO NETWORK NODE IN AN UNLICENSED SPECTRUM

TECHNICAL FIELD

This disclosure relates to discovery signals in an unlicensed spectrum. In more particular, it relates to a wireless device, a radio network node, a network system and methods therein, for enabling the wireless device to communicate with the radio network node in the unlicensed spectrum.

BACKGROUND

As the number of wireless devices increases, there is an endeavour to increase resource utilization in radio frequency spectrum.

Licensed radio frequency spectrum, for which long term evolution (LTE) is designed, provides many benefits in terms of network planning and quality-of-service guarantees, in relation to an unlicensed radio frequency spectrum. Since the amount of licensed spectrum is limited and has a price in terms of license cost, many operators exploit unlicensed spectrum, which comes at no licensing cost, as a complement in order to offload the LTE networks. In most cases, WiFi based on the IEEE 802.11 family of technologies is the technology used. Although WiFi provides means to access unlicensed spectrum, it has several drawbacks such as limited support for mobility and quality-of-service handling. Recently, the interest in using LTE for accessing unlicensed spectrum has increased.

Carrier aggregation, where a wireless device receives or transmits on multiple component carriers, is an integral part of LTE from release 10 onwards. In the LTE specifications, the component carriers correspond to a primary cell (PCell) and secondary cells (SCells).

From the perspective of the wireless device, there is only one PCell, whereas there may be one or more SCells. Cross-carrier scheduling is also supported, in which case downlink assignments and uplink scheduling grants relating to one carrier, e.g. an SCell, may be sent on another carrier, e.g. the PCell, using the (enhanced) physical downlink control channel ((E)PDCCH). Similarly, uplink control signalling on physical uplink control channel (PUCCH) from a user equipment (UE) to an evolved NodeB (eNodeB) is transmitted on the PCell regardless of whether it relates to the PCell or a SCell.

One possibility for accessing unlicensed spectrum with LTE is to build on the carrier aggregation framework already part of LTE, where the primary carrier corresponding to a PCell operates in a licensed spectrum whereas one or more secondary carriers corresponding to one or more SCells operate in an unlicensed spectrum.

The PCell is used for all mobility procedures, handles all critical control signalling, as well as user data, whereas the one or more SCells are used for best effort user data. This approach allows exploiting the unlicensed spectrum for LTE users without scarifying mobility and quality-of-service support. In addition, the operator only needs to handle one network.

An alternative to carrier aggregation is dual connectivity framework currently being developed in 3GPP, for multiple component carriers. In dual connectivity the carriers are associated with different base stations. Dual connectivity applied to licensed and unlicensed spectra, provides flexibility as the licensed and unlicensed accesses are implemented in separate nodes.

This is in contrast to carrier aggregation, where a PCell and a SCell are co-located in the same network node or base station.

Before an LTE wireless device may communicate with an LTE radio network node, the wireless device has to find and acquire synchronization to a cell within the LTE network and determine the identity of the cell found. This process is known as cell search. To assist the wireless device in this process, LTE defines two signals, the primary and secondary synchronization signals (PSS and SSS), which are transmitted from every LTE cell. The PSS/SSS are transmitted regularly every 5 ms. By measuring on these signals, the wireless device may establish time and frequency synchronization with the cell. Furthermore, different cells use different sequences and the wireless device may therefore establish the physical-layer cell identity by observing which PSS and SSS sequence in the set of possible sequences the cell in question used. Once synchronization to a cell is obtained, the wireless device may receive system information transmitted by each cell to obtain information necessary for accessing the system. The system information contains the so-called public land mobile network identity (PLMN ID), which is a globally unique identity of the operator to which the cell belongs. The PSS/SSS pair to use in a specific cell is determined by the operator as part of the network planning Since LTE operates in licensed spectrum, the same set of PSS/SSS sequences may be used by multiple operators as they are assigned different carrier frequencies.

For operation in unlicensed spectrum, as well as part of general enhancements to LTE in other areas such as coordinated multipoint transmission and reception (CoMP), so-called discovery signals are discussed.

A discovery signal is a sequence or set of sequences, typically of orthogonal frequency division multiplexing (OFDM) symbols, which are transmitted infrequently, e.g. a few times per second, from a transmission point, or a radio network node. A discovery signal may comprise un-modulated tones transmitted on a sequence of OFDM symbols.

By searching for discovery signals, a wireless device may find the transmission point and report e.g. the received signal quality to the network, which may use this information to determine whether the transmission point should be used for transmission to that wireless device or not.

In case of operation in unlicensed spectrum, each radio network node that transmits in unlicensed spectrum also transmits a discovery signal. Based on wireless device measurements on observed discovery signals, the radio network node may determine whether the wireless device should receive transmissions from a SCell that is operating in unlicensed spectrum.

The radio network node may configure the wireless device to search for a particular set of discovery signals. Alternatively, the wireless device searches over the full set of discovery signals without receiving information from the radio network node about the subset of discovery signals to search for. Upon detection of a discovery signal, the wireless device may report the signal quality back to the cell to which it is connected, after which the radio network node may, based upon this, take the desired action.

Transmissions in LTE are fully scheduled, i.e. a radio network node, such as an eNodeB is in control of when and on what resources wireless device, such as a UE shall be transmitting.

Figure 1:
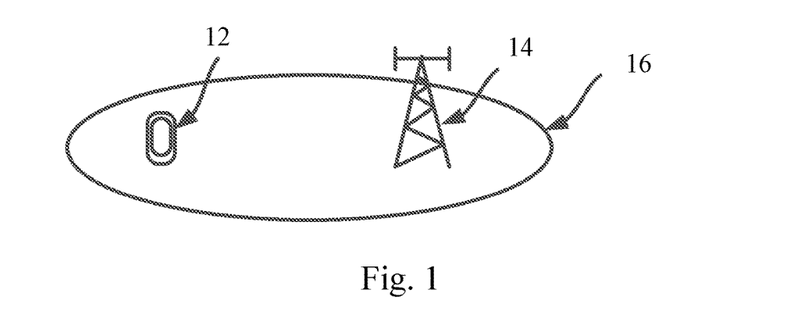
FIG. 1 schematically illustrates a communication network.

FIG. 1 schematically presents a network 16, in which a UE, 12 is served by an eNodeB 14.

In contrast to LTE, transmissions in WiFi are not scheduled but are autonomously handled.

Figure 2:
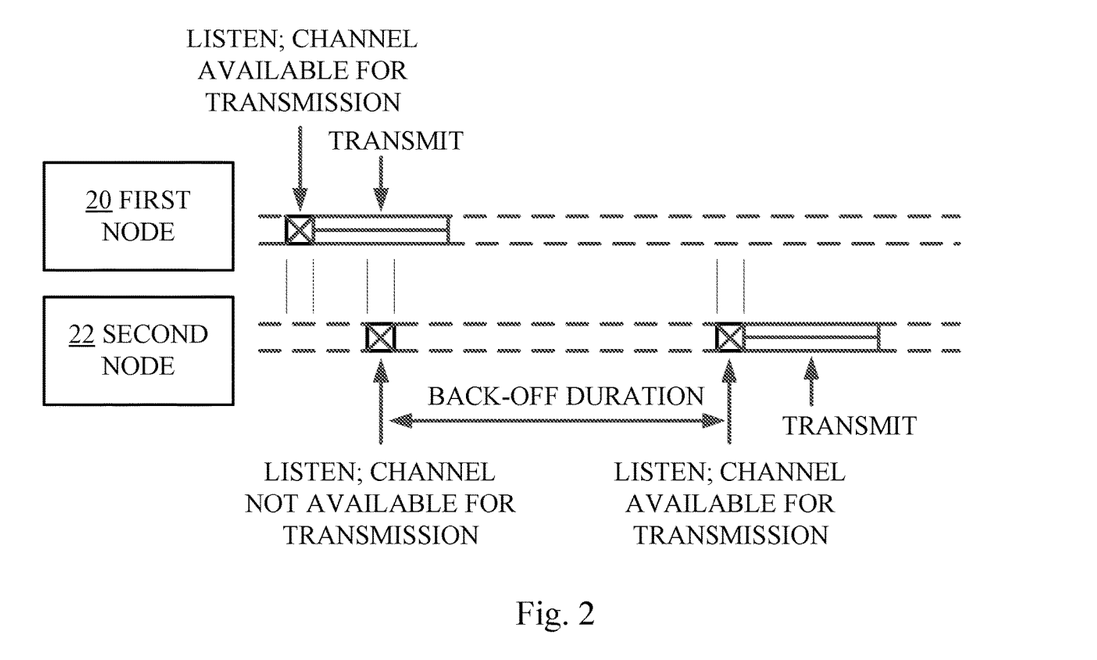
FIG. 2 schematically illustrates resource availability check in prior art.

FIG. 2 presents a scheme for transmission in WiFi, illustrating a first node 20, and a second node, 22 attempting unscheduled transmission. When the first node 20 has data to transmit, it listens to the channel activity for a certain amount of time, for example 20 microseconds (μs), and assesses whether the channel is available for transmission. Since the second node 22 is not transmitting any data during the listening time of the first node 20, the first node, 20 assesses that the channel is available for transmission, and may thus start transmission on the channel.

If the second node 22, assesses the channel availability during transmission by the first node 20, the second node 22 assesses that the channel as not available for uplink transmission. The second node 22 then waits a "back-off duration" in time, after which it assesses the channel availability again. Since the first node 20 does not transmit any data during this time, the second node 22 declares the channel available for transmission, after which it may transmit uplink data.

The scheme as presented in FIG. 2 is called listen before talk (LBT) since a node has to listen to the channel and assess the availability before it may transmit, i.e. talk. The use of LBT allows WiFi devices to share the spectrum among a multiple of other WiFi nodes. Moreover, the LBT allows WiFi devices to share the spectrum among non-WiFi devices.

There may also be regulatory requirements on LBT or similar schemes in some bands and regions.

When extending LTE to access an unlicensed spectrum on a SCell, it may be beneficial and may become a requirement to support LBT. In the downlink, the eNodeB may listen on the channel prior to the start of a subframe and, if the channel is declared available, schedule data transmissions in the subframes following the listening period.

The same principle may be applied in the uplink. If the UE finds the channel available, it follows the scheduling grant from the eNodeB and transmits in the uplink, otherwise it ignores the grant.

Preferably, the LBT period for all UEs connected to the same unlicensed node overlap as transmissions within that SCell are coordinated through scheduling. Uplink transmission should be avoided only when other nodes (e.g. WiFi) are currently using the channel.

Multiple operators may use the same unlicensed spectrum. Unless some other inter-operator coordination mechanism is used, the LBT period between different operators should in this case preferably not overlap as there is no scheduling coordination between the different operators. From one operator's perspective, another operator using LTE in unlicensed spectrum is no different from another operator using WiFi in unlicensed spectrum. A similar problem may also arise for different nodes belonging to the same operator if these nodes are not tightly coordinated.

In unlicensed spectrum, determining a discovery signal sequence in unlicensed spectrum cannot rely on network planning since multiple operators may use the same standard and hence the same overall set of possible sequences in the same spectrum. This is in contrast to traditional PSS/SSS configuration, for cell planning, in licensed spectrum, where only one operator exists on each frequency in a given geographical area.

Also, linking the discovery signal sequence to use in a particular network node to the globally unique PLMN ID may not be a good idea either, as the set of possible sequences becomes very large due to the large number of possible PLMN IDs.

There is hence a need for a solution addressing these issues as discussed above.

SUMMARY

It is an object of exemplary embodiments to address at least some of the issues outlined above, and this object and others are achieved by a wireless device, a radio network node and methods therein, according to the appended independent claims, and by embodiments of the exemplary embodiments according to the dependent claims.

According to an aspect, the exemplary embodiments provide a method in a wireless device for communicating with a radio network node. Within the method the radio network node serves a first cell in a licensed spectrum and a second cell in an unlicensed spectrum. The method comprises determining at least one first sequence of a discovery signal, based on carrier frequency information of the first cell. The method also comprises receiving a second sequence of the discovery signal in the second cell. In addition, the method comprises determining if said at least one first sequence match the second sequence.

According to another aspect, the exemplary embodiments provide a method in a radio network node for communicating with a wireless device. Within the method the radio network node serves a first cell in a licensed spectrum and a second cell in an unlicensed spectrum. The method comprises determining at least one first sequence of a discovery signal for the wireless device based on carrier frequency information of the first cell. In addition, the method comprises transmitting the sequence of the discovery signal in the second cell.

According to yet another aspect, the exemplary embodiments provide a wireless device that is adapted to communicate with a radio network node. The wireless device comprises a receiver, and a processing unit. The processing unit is adapted to determine at least one first sequence of a discovery signal, based on carrier frequency information of the first cell. The processing unit is further adapted to receive via the receiver a second sequence of the discovery signal in a second cell. In addition, the processing unit is further adapted to determine if said at least one first sequence match the second sequence.

According to still yet another aspect, the exemplary embodiments provide a radio network node that is adapted to communicate with a wireless device. The radio network node comprises a transmitter, and a processing unit. The processing unit is adapted to determine a sequence of a discovery signal for the wireless device based on carrier frequency information of a first cell in a licensed spectrum. In addition, the processing unit is adapted to transmit via the transmitter the sequence of the discovery signal in a second cell in an unlicensed spectrum.

According to yet another aspect, the exemplary embodiments provide a method in a network system comprising a radio network node serving a first cell in a licensed spectrum and a second cell in an unlicensed spectrum and further comprising a wireless device the method comprising: determining by said radio network node a sequence of a discovery signal for the wireless device based on carrier frequency information of the first cell; transmitting by said radio network node the sequence of the discovery signal in the second cell in the unlicensed spectrum; determining by the wireless device at least one first sequence of a discovery signal, based on the carrier frequency information of the first cell receiving by the wireless device from the radio network node the second sequence of the discovery signal in the second cell; and determining by the wireless device if said at least one first sequence matches the second sequence.

The exemplary embodiments provide discovery signals in an unlicensed spectrum, and enable wireless devices to determine if a discovery signal in an unlicensed spectrum is associated with the operator of the wireless device.

BRIEF DESCRIPTION OF THE DRAWINGS

Embodiments will now be described in more detail, and with reference to the accompanying drawings, in which.

DETAILED DESCRIPTION

In the following description, different embodiments of the exemplary embodiments will be described in more detail, with reference to accompanying drawings. For the purpose of explanation and not limitation, specific details are set forth, such as particular examples and techniques in order to provide a thorough understanding.

Determination of and use of discovery signal sequence(s) in unlicensed spectrum cannot rely on network planning. This is because multiple operators may use the same standard, which could result in the same set of discovery signal sequences being used by two or more operators.

There is therefore a need to enable wireless devices to determine if a signal sequence of a discovery signal is associated with the operator of the wireless device.

By determining a sequence of a discovery signal, based on a quantity that is unique to a cell in a licensed spectrum of an operator, a wireless device may determine if a received sequence of the discovery signal is a sequence from the operator of the wireless device.

As will be described further down, the determination of a discovery signal sequence may also be based on a physical-layer cell identity (ID) of the cell in the licensed spectrum.

Figure 3:
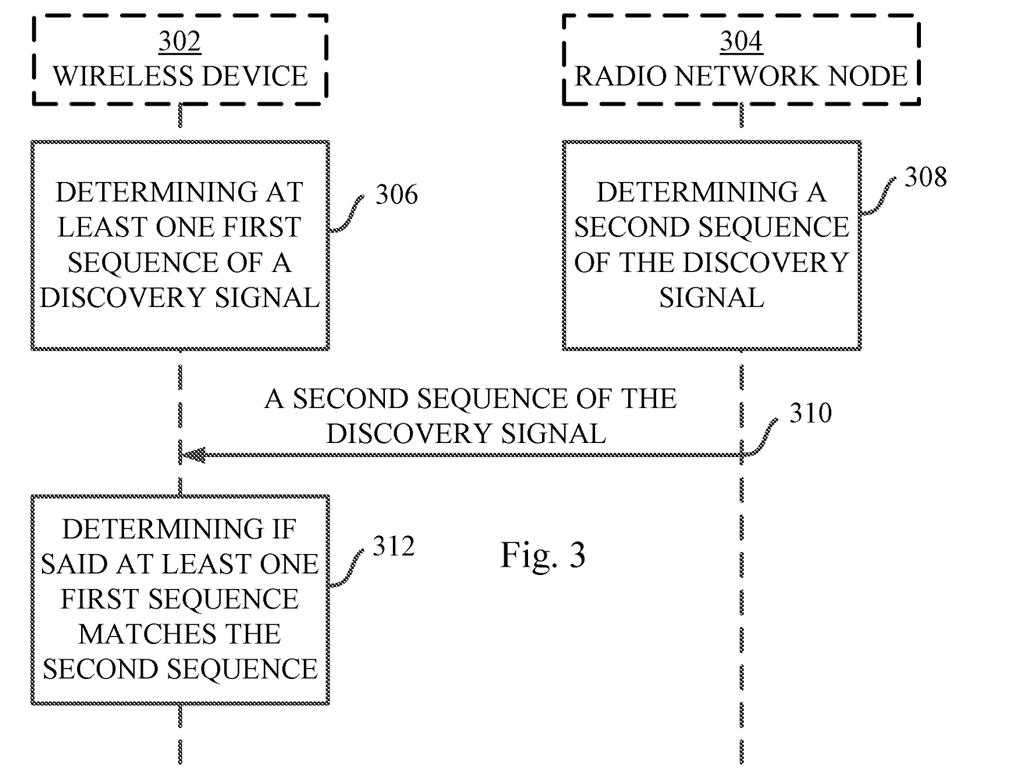
FIG. 3 presents a handshake diagram of signalling according to embodiments of the exemplary embodiments.

FIG. 3 presents a handshake diagram of signaling between a wireless device 302 and a radio network node 304, for enabling communication between the wireless device 302 and the radio network node 304. The radio network node 304 serves a first cell in a licensed spectrum and a second cell in an unlicensed spectrum.

In 306, the wireless device 302 determines at least one first sequence of a discovery signal, based on carrier frequency information of the first cell. The wireless device has prior knowledge of the carrier frequency of the first cell.

Since a carrier frequency of the first cell is unique for the operator, the at least one first sequence will be associated with the operator of the wireless device. By determining one or more first sequences, the wireless device determines one or more possible sequences of a discovery signal associated with the operator.

In 308, the radio network node 304 determines a sequence of the discovery signal for the wireless device, based on the carrier frequency information of the first cell. The sequence as determined by the radio network node is in FIG. 3 denoted a "second" sequence.

In 310, the radio network node 304 transmits the second sequence of the discovery signal in the second cell in the unlicensed spectrum.

In 312, the wireless device 302 determines if said at least one first sequence match the second sequence. The wireless device thus determines if any of the possible first sequences match the second sequence as received from the radio network node. The wireless device may thus determine a first sequence in the unlicensed spectrum, which first sequence is associated with the operator of the first cell in the licensed spectrum.

Figure 4:
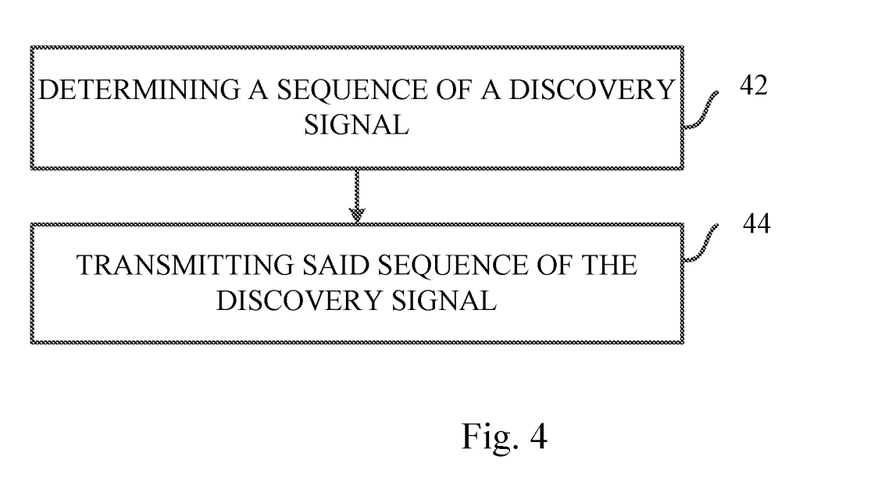
FIGS. 4 and 5 illustrate flow-charts of methods according to embodiments of the exemplary embodiments.

FIG. 4 presents a flow chart of a method in a radio network node for communicating with a wireless device. Within the method the radio network node serves a first cell in a licensed spectrum and a second cell in an unlicensed spectrum. The method comprises determining 42 a sequence of a discovery signal for the wireless device based on carrier frequency information of the first cell. In addition, the method comprises transmitting 44 the sequence of the discovery signal in the second cell.

Determining 42 the sequence of the discovery signal, within the method in the radio network node, may be based on a function dependent on the carrier frequency information of the first cell.

Determining 42 the sequence of the discovery signal for the wireless device, within the method in the radio network node, may be based on physical layer cell identity information of the first cell.

Figure 5:
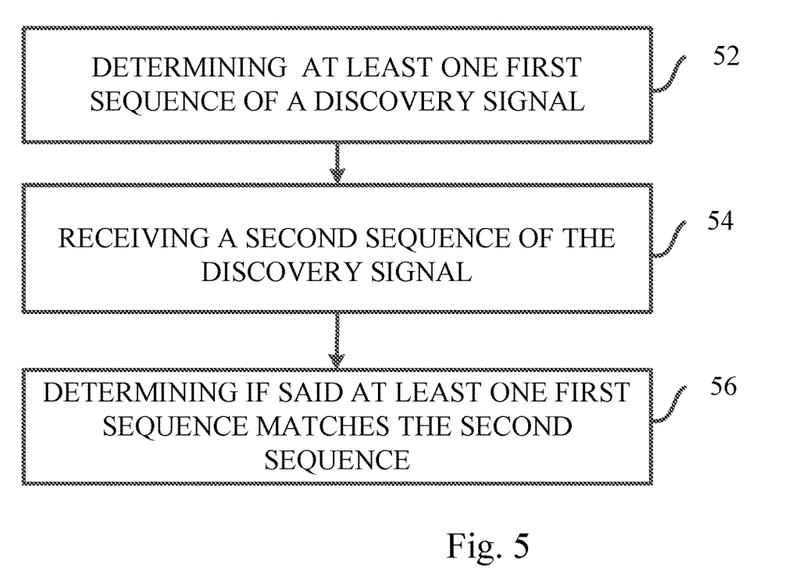

FIG. 5 presents a flow chart of a method in a wireless device for communicating with a radio network node. Within the method the radio network node serves a first cell in a licensed spectrum and a second cell in an unlicensed spectrum. The method comprises determining 52 at least one first sequence of a discovery signal, based on carrier frequency information of the first cell. The method also comprises receiving 54 a second sequence of the discovery signal in the second cell. In addition, the method comprises determining 56 if said at least one first sequence match the second sequence.

Determining 52 the at least one first sequence of the discovery signal, within the method in the wireless device, may be based on a function dependent on the carrier frequency information of the first cell. An example of a function may be a two-dimensional table having at least two columns, one column comprising PCell frequency information and the other columns corresponding discovery signal sequence information as explained below. For such a function, for each PCell-frequency information a list of discovery signal sequence(s) that may be used may be defined. Another example of a function may be to define a discovery signal index as: "discovery single index=PCell-frequency mod N" were mod stands for modulo operation and N is the number of possible discovery signals or the number of possible discovery signal sequences.

The method in the wireless device may further comprise receiving physical layer cell identity information of the first cell, and determining 52 the at least one first sequence of the discovery signal, may be based on the received physical layer cell identity information of the first cell.

Determining 56 if said at least one first sequence match the second sequence, within the method in the wireless device, may comprise mapping the at least one first sequence with the second sequence.

The determination of the discovery signal sequence or sequences a given second cell operating in unlicensed spectrum should use may be based on a function taking as input a quantity of the first in licensed spectrum, which quantity differs between operators. For example, the discovery signal to use could be based on the carrier frequency of the first cell alone, or on the carrier frequency of the first cell and the physical-layer cell ID of the first cell.

These two alternatives ensure that different operators using the same unlicensed spectrum may be assigned different discovery signals.

One possibility to organize a set of possible discovery signal sequences is to divide them into groups with one of or more signals in each group. Denote the discovery signal sequence transmitted by a particular node as Cij where i is a group number and j the number of the sequence within group i. The number i is then determined as a function of the quantity that differ between operators, as mentioned above. The number j may be selected freely by the operator, if there are more than one discovery signal sequence in the group i.

TABLE 1

Example of possible grouping of discovery signal sequences

| Cij | j = p | j = q | j = r |
| --- | --- | --- | --- |
| i = k | Ckp | Ckq | Ckr |
| i = m | Cmp | Cmq | Cmr |

Including the physical-layer cell identity in the discovery signal selection is beneficial when a cell using unlicensed spectrum at least to some degree overlaps multiple other cells in licensed spectrum.

Figure 6:
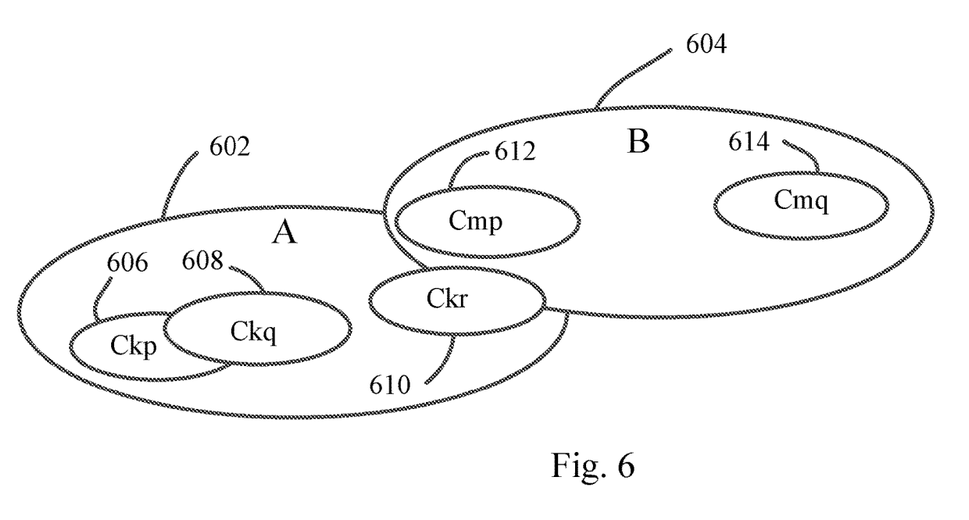
FIG. 6 schematically illustrates cells in unlicensed spectrum within cells in licensed spectrum according to embodiments of the exemplary embodiments.

FIG. 6 schematically illustrates an example in which cells in unlicensed spectrum within other cells in licensed spectrum according to embodiments of the exemplary embodiments.

In FIG. 6 cell 610 having discovery signal sequence Ckr, is used in aggregation with a licensed cell A, 602 partially overlaps licensed cell B, 604. If the discovery signal sequence Ckr is used also by cells operating in aggregation with cell B, 604, the network cannot distinguish between cases where the unlicensed cell 610 should not be included in a carrier aggregation setup and when it should.

Basing discovery signal selection on the carrier frequency of a cell in a licensed spectrum may thus not be sufficient. Neither would it be sufficient to base the discovery signal selection on a PLMN ID alone.

Therefore, discovery signal selection may in addition be based on the physical-layer cell identity of the cell in the licensed spectrum, with which the second cell may be aggregated with.

Multiple sequences in a group is useful if an operator has multiple unlicensed cells nodes operating in aggregation with the same licensed cell. One example is cells 606 and 608, having discovery signals Ckp and Ckq, respectively, in FIG. 6. Another example is cells 612 and 614, operating in aggregation with licensed cell B, 604, having discovery signal sequences Cmp and Cmq, respectively.

Figure 7:
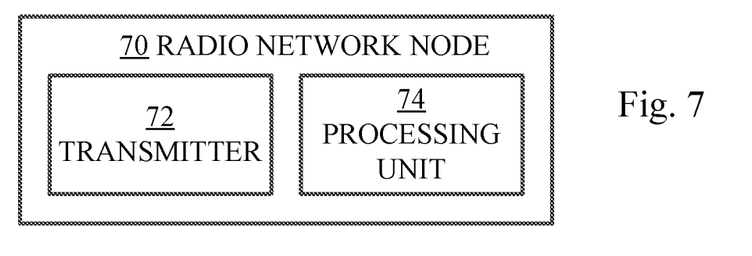
FIGS. 7 and 8 schematically present a radio network node according to embodiments of the exemplary embodiments.

FIG. 7 schematically presents a radio network node 70 for a communicating with a wireless device. The radio network node 70 comprises a transmitter 72, and a processing unit 74. The processing unit is adapted to determine 42 a sequence of a discovery signal for the wireless device based on carrier frequency information of a first cell in a licensed spectrum. In addition, the processing unit 74 is adapted to transmit 44 via the transmitter 72 the sequence of the discovery signal in a second cell in an unlicensed spectrum.

The processing unit 74 of the radio network node 70 may comprise a processor and a memory and wherein said memory contains instructions executable by said processor.

The processing unit 74 of the radio network node 70 may further be adapted to determine 42 the sequence of the discovery signal, based on a function dependent on the carrier frequency information of the first cell.

The processing unit 74 of the radio network node 70 may further be adapted to determine 42 the sequence of the discovery signal for the wireless device based on physical layer cell identity information of the first cell.

The radio network node 70 may be configured to serve the first cell being a primary cell, PCell, and may be configured to serve the second cell being a secondary cell, SCell.

The radio network node 70 may comprise an eNodeB.

Figure 8:
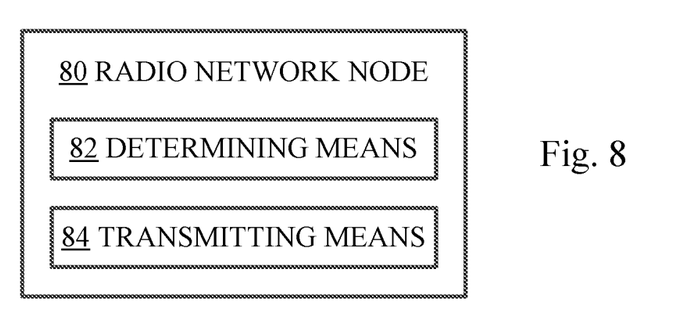

FIG. 8 schematically presents a radio network node 80 for a communicating with a wireless device. The radio network node 80 comprises determining means 82 and transmitting means 84. The determining means 82 is adapted to determine 42 a sequence of a discovery signal for the wireless device based on carrier frequency information of a first cell in a licensed spectrum. The transmitting means 84 is adapted to transmit 44 the sequence of the discovery signal in a second cell in an unlicensed spectrum.

Figure 9:
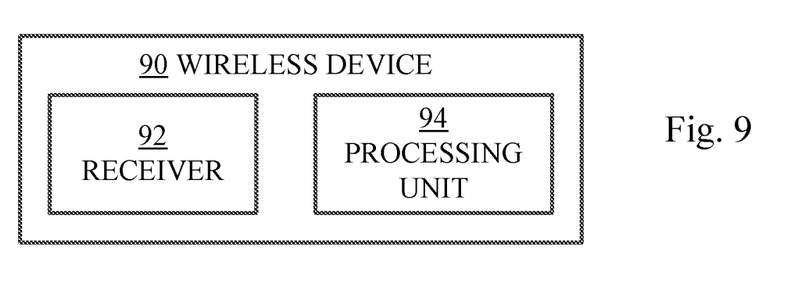
FIGS. 9 and 10 schematically present a wireless device according to embodiments of the exemplary embodiments.

FIG. 9 schematically presents a wireless device 90 that is adapted to communicate with a radio network node 70, 80. The wireless device 90 comprises a receiver 92, and a processing unit 94. The processing unit 94 is adapted to determine 52 at least one first sequence of a discovery signal, based on carrier frequency information of the first cell. The processing unit 94 is further adapted to receive 54 via the receiver 92 a second sequence of the discovery signal in a second cell. In addition, the processing unit 94 is further adapted to determine 56 if said at least one first sequence match the second sequence.

The processing unit 94 of the wireless device 90 may comprise a processor and a memory and wherein said memory contains instructions executable by said processor.

The processing unit 94 of the wireless device 90 may further be adapted to determine 52 the at least one first sequence of the discovery signal, based on a function dependent on the carrier frequency information of the first cell.

The processing unit 94 of the wireless device 90 may further be adapted to receive via the receiver 92 physical layer cell identity information of the first cell. The processing unit 94 may further be adapted to determine 52 the at least one first sequence of the discovery signal, based on the received physical layer cell identity information of the first cell.

The processing unit 94 of the wireless device 90 may further be adapted to map the at least one first sequence with the second sequence.

The wireless device may comprise a UE.

Figure 10:
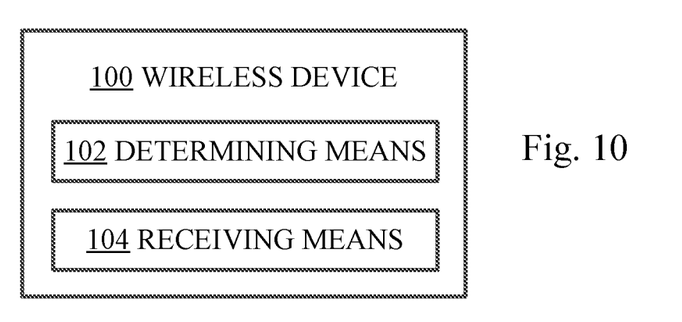

FIG. 10 schematically presents a wireless device 100 that is adapted to communicate with a radio network node 70, 80. The wireless device 100 comprises determining means 102 and receiving means 104. The determining means 102 is adapted to determine 52 at least one first sequence of a discovery signal, based on carrier frequency information of the first cell. The receiving means 104 is adapted to receive 54 a second sequence of the discovery signal in a second cell. In addition, the determining means 102 is adapted to determine 56 if said at least one first sequence match the second sequence.

Hence, according to some exemplary embodiments, there is provided a method in a network system comprising a radio network node serving a first cell in a licensed spectrum and a second cell in an unlicensed spectrum and further comprising a wireless device the method comprising: determining by said radio network node a sequence of a discovery signal for the wireless device based on carrier frequency information of the first cell; transmitting by said radio network node the sequence of the discovery signal in the second cell in the unlicensed spectrum; determining by the wireless device at least one first sequence of a discovery signal, based on the carrier frequency information of the first cell receiving by the wireless device from the radio network node the second sequence of the discovery signal in the second cell; and determining by the wireless device if said at least one first sequence matches the second sequence.

Embodiments herein may be applicable to cases in which there are two or more carriers. Two examples of frameworks for using two or more carriers are carrier aggregation and dual connectivity.

Carrier aggregation is an integral part of LTE. In current LTE specifications, the component carriers correspond to a PCell (Primary Cell) and one or more SCells (Secondary Cells).

In carrier aggregation, the PCell and the one or more SCells are co-located in the same radio network node.

In dual connectivity, two carriers are associated with separate radio network nodes.

For dual connectivity as a frame work for license-assisted access to unlicensed spectrum, the nodes operating in unlicensed spectrum may receive information about which discovery signals to transmit over the X2 interface from a radio eNodeB operating in licensed spectrum in the same area. Alternatively, the sequence may be set directly by the operator through the operation and maintenance (O&M) system.

Carrier aggregation or dual connectivity may be combined with exploiting an unlicensed spectrum. In carrier aggregation, the PCell will then correspond to the licensed spectrum, and the one or more SCells will correspond to an unlicensed spectrum.

Using dual connectivity provides additional flexibility as licensed access and unlicensed access are implemented in separate nodes.

Although embodiments may be described using an emphasis on carrier aggregation framework, the dual connectivity framework may be used equally well.

Above, the exemplary embodiments have been described in the context of determining an operator specific discovery signal sequence to use. However, the principle may be used when determining other parameters which should preferably differ between different operators, for instance the LBT time instant in a cell when operating in unlicensed spectrum.

It is noted that operator specific LBT periods between cells in a synchronized network may be achieved by linking the listening instant to the PLMN ID, but also in this case the linkage may become cumbersome as there is a large number of possible PLMN IDs. Furthermore, an operator with a specific PLMN ID may or may not want the LBT instants to overlap between nodes belonging to said operator, in which case a PLMN-ID linkage is less desirable.

With the described embodiments herein the following advantages may be achieved: Providing discovery signals in an unlicensed spectrum and enabling wireless devices to determine if a discovery signal in an unlicensed spectrum is associated with the operator of the wireless device. Thus, the exemplary embodiments provide different operators using the same unlicensed spectrum different discovery signals. License-assisted access to unlicensed spectrum is thus enabled.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

3GPP $3^{rd}$ generation partnership project
CoMP coordinated multi point transmission and reception
(E)PDCCH (enhanced) physical downlink control channel
ID identity
LBT listen before talk
LTE long term evolution
O&M operation & maintenance
OFDM orthogonal frequency division multiplexing
PCell primary cell
PLMN public land mobile network
PSS primary synchronization signal
PUCCH physical uplink control channel
SCell secondary cell
SSS secondary synchronization signal
UE user equipment

What is claimed is:

1. A method in a wireless device for communicating with a radio network node, the radio network node serving a first cell in a licensed spectrum and a second cell in an unlicensed spectrum, the method comprising:
   determining a first sequence of a discovery signal, based on physical layer cell identity information for the first cell;
   receiving a second sequence of the discovery signal in the second cell; and
   determining whether the first sequence matches the second sequence.

2. The method of claim 1, further comprising determining the first sequence of the discovery signal, based on a function dependent on carrier frequency information for the first cell.

3. The method of claim 1, wherein determining whether the first sequence matches the second sequence comprises mapping the at least one first sequence with the second sequence.

4. A method in a radio network node for communicating with a wireless device, the radio network node serving a first cell in a licensed spectrum and a second cell in an unlicensed spectrum, the method comprising:
   determining a sequence of a discovery signal for the wireless device based on physical layer cell identity information for the first cell; and
   transmitting the sequence of the discovery signal in the second cell in the unlicensed spectrum.

5. A wireless device adapted to communicate with a radio network node, the wireless device comprising:
   a receiver; and
   a processing unit circuit configured to:

determine a first sequence of a discovery signal, based on physical layer cell identity information for the first cell;
receive via the receiver a second sequence of the discovery signal in a second cell; and
determine whether the first sequence matches the second sequence.

6. The wireless device of claim 5, wherein the processing circuit is further configured to determine the first sequence of the discovery signal, based on a function dependent on carrier frequency information for the first cell.

7. The wireless device of claim 5, wherein the processing circuit is further configured to map the first sequence with the second sequence.

8. A radio network node adapted to communicate with a wireless device, said radio network node comprising:
a transmitter; and
a processing circuit configured to:
determine a sequence of a discovery signal for the wireless device based on physical layer cell identity information for a first cell in a licensed spectrum; and
transmit via the transmitter the sequence of the discovery signal in a second cell in an unlicensed spectrum.

9. The radio network node of claim 8, being configured to serve the first cell being a primary cell (PCell) and further being configured to serve the second cell being a secondary cell (SCell).

10. A method in a network system comprising a radio network node serving a first cell in a licensed spectrum and a second cell in an unlicensed spectrum and further comprising a wireless device, the method comprising:
determining by said radio network node a sequence of a discovery signal for the wireless device based on physical layer cell identity information for the first cell;
transmitting by said radio network node the sequence of the discovery signal in the second cell in the unlicensed spectrum;
determining by the wireless device a first sequence of a discovery signal, based on the physical layer cell identity information for the first cell;
receiving by the wireless device from the radio network node the second sequence of the discovery signal in the second cell; and
determining by the wireless device whether the first sequence matches the second sequence.

* * * * *